(12) United States Patent
Amanai (10) Patent No.: US 7,248,421 B2
(45) Date of Patent: *Jul. 24, 2007

(54) IMAGE FORMING OPTICAL SYSTEM AND ELECTRONIC INSTRUMENT USING THE SAME

(75) Inventor: Takahiro Amanai, Kanagawa-ken (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/364,409

(22) Filed: Mar. 1, 2006

(65) Prior Publication Data

US 2006/0146423 A1    Jul. 6, 2006

Related U.S. Application Data

(63) Continuation of application No. 10/828,415, filed on Apr. 21, 2004, now Pat. No. 7,061,694.

(30) Foreign Application Priority Data

Apr. 22, 2003  (JP)  ............................. 2003-116941
Apr.  6, 2004  (JP)  ............................. 2004-111986

(51) Int. Cl.
  *G02B 9/34*   (2006.01)
  *G02B 13/18*  (2006.01)
  *G02B 3/02*   (2006.01)

(52) U.S. Cl. ..................................... 359/773; 359/715

(58) Field of Classification Search ................ 359/773, 359/708, 715

See application file for complete search history.

(56) References Cited

U.S. PATENT DOCUMENTS

| 5,272,566 A | 12/1993 | Aoki |
| 5,392,431 A | 2/1995 | Pfisterer |
| 5,434,711 A | 7/1995 | Tetsuya et al. |
| 6,560,043 B1 | 5/2003 | Saito |
| 6,577,451 B2 | 6/2003 | Yamakawa |
| 6,584,282 B2 | 6/2003 | Saito |
| 7,012,765 B2 * | 3/2006 | Matsui et al. ............... 359/773 |

FOREIGN PATENT DOCUMENTS

| JP | 007-027974 | 1/1995 |
| JP | 11-052227 | 2/1999 |
| JP | 2001-133684 | 5/1999 |

* cited by examiner

*Primary Examiner*—Alicia M Harrington
(74) *Attorney, Agent, or Firm*—Pillsbury Winthrop Shaw Pittman LLP (57) ABSTRACT

An imaging optical system includes, in order from an object side, a first lens having positive refracting power, a concave surface of which is directed toward the object side, a third lens having positive refracting power, a convex surface of which is directed toward an image side and a fourth lens having negative refracting power, wherein the second lens and the third lens are cemented together. Having such a configuration, an angle made by the incident light and the exiting light to the cemented lens can be kept small, and accordingly, the generation of aberrations at the refracting surface and performance change of lenses when these are in a relative decentering position can be suppressed.

4 Claims, 10 Drawing Sheets

Fig. 7A SPHERICAL ABERRATION
Fig. 7B ASTIGMATISM
Fig. 7C DISTORTION

IMAGE FORMING OPTICAL SYSTEM AND ELECTRONIC INSTRUMENT USING THE SAME

This is a continuation application of U.S. patent application Ser. No. 10/828,415, filed Apr. 21, 2004, now U.S. Pat. No. 7,061,694, which relies for priority upon Japanese Patent Application Nos. 2003-116941, filed Apr. 22, 2003, 2004-111986, filed Apr. 6, 2004, the contents of all of which are hereby incorporated by reference in their entireties.

BACKGROUND OF THE INVENTION

1. Field of the Invention

The present invention relates to an image forming optical system which can be used by combining with the solid-state imaging element of CCD, CMOS and the like. And it also relates to an image forming optical system which can be used for a miniature camera and a monitor camera and the like which are equipped in, for example, a digital still camera, a digital video camera, a cellular phone, PC and the like. Furthermore, the present invention also relates to an electronic instrument such as a digital still camera, a digital video camera, a cellular phone, PC and the like which use the image forming optical system.

2. Description of the Related Art

In recent years, electronic cameras for taking a photograph by using a solid-state imaging element like CCD and CMOS instead of using a silver salt film have become popular. In such electronic cameras, for an imaging unit which is equipped in a portable type computer or a cellular phone and the like, miniaturization and weight-lightening have been particularly demanded.

SUMMARY OF THE INVENTION

According to the present invention, an image forming optical system with an aperture stop comprises, in order from an object side, a first lens having positive refracting power, a second lens having negative refracting power, a concave surface of which is directed toward an object side, a third lens having positive refracting power, a convex surface of which is directed toward the image side and a fourth lens having negative refracting power, wherein the second lens and the third lens are cemented. By such constitution, an image forming optical system in which performance and size are optimum can be provided.

According to the present invention, an image forming optical system with an aperture stop comprises, in order from an object side, a first lens having positive refracting power ,a second lens having negative refracting power, a concave surface of which is directed toward an object side, a third lens having positive refracting power, a convex surface of which is directed toward the image side and a fourth lens having negative refracting power, wherein the first lens consists of glass, and the second lens and the third lens are cemented.

An electric apparatus according to the present invention comprises the image forming optical system mentioned above.

According to the present invention, an image forming optical system in which degradation of performance to manufacture error is little and high performance is achieved even if it is miniaturized can be obtained.

These and other features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, reasons why the constitution of the present invention has been made as well as function and advantages of the present invention will be explained.

According to the present image forming optical system, an image forming optical system with an aperture stop comprises, in order from an object side, a first lens having positive refracting power, a second lens having negative refracting power, a concave surface of which is directed toward an object side, a third lens having positive refracting power, a convex surface of which is directed toward the image side and a fourth lens having negative refracting power, wherein the second lens and the third lens are cemented.

According to the present invention, taking into account of the performance and miniaturization of the image forming optical system, it is constituted with four lenses that are a first lens having positive refracting power, a second lens having negative refracting power, a third lens having positive refracting power and a fourth lens having negative refracting power.

It is evident that if the number of the lens which constitutes the image forming optical system is five or more than five, performance is improved further. However, the thickness of the lens, the distance between lenses and the space of a frame become larger by increasing one piece of lens. Consequently, large sizing of the image forming optical system cannot be avoided.

It is difficult that chromatism is compatible with curve of an image surface on optical axis when the number of lens is less than three. Even if a performance be secured by using many aspherical surfaces, it is difficult to manufacture since decentering sensitivity becomes big. Therefore, constituting an image forming optical system with four pieces of lens is best for performance as well as size together.

According to the present image forming optical system, chromatism can be well corrected since it is constituted with a cemented lens by a second lens having negative refracting power and a third lens having positive refracting power. Also, the total length can be shortened since the air space between the second lens and the third lens can be eliminated. In this image forming optical system, the surface of an object side of the second lens and the center of curvature of the surface of an image side of the third lens are directed toward the object side. By such constitution an angle of deflection that is an angle made by an incident light and exiting light to the cemented lens can be kept small. As a result, the generation of an aberration in each refracting surface can be made small to the utmost. Also, it becomes possible to make small to the utmost about performance change. at the time of the relative decentering of the lens because the generation of the aberration in case of non-decentering is small.

An aperture stop is arranged on the object side of the first lens having positive refracting power.

When using CCD for example as an imaging element in order to maintain a good performance for collecting light, the incidence angle of light to an imaging element must be made small. For this purpose, it is desirable to arrange an aperture stop in a distant position from an image plane. Otherwise, it is desirable to form an image of the aperture stop in the distant position far from the image plane. Furthermore, by constituting the aperture stop with movable parts, it is possible to change F number and perform a role of shutter. However, in this case, it is difficult to arrange it between lenses from the viewpoint of securing space. Accordingly, in this image forming optical system, the position of the aperture stop is arranged at the object side of the first lens having positive power. With this arrangement, it is possible to make the aperture stop have multifunction. Moreover, with this arrangement, an optical system in which importance of telecentric nature and productivity are taken into consideration can be realized.

In this image forming optical system, in order to shorten the whole length of the image forming optical system, the fourth lens having negative power is arranged. Here, for example, it is supposed that CCD is used as an imaging element to enable to limit an incidence angle in order to avoid the shading. In this case, if the lens on the utmost object side has negative power in a wide-angle optical system it is inconvenient because the incidence angle of the light cannot be made small at the position where the height of the light is big. Therefore, at least one surface of the lens on the utmost object side (the fourth lens) is aspherical. And then, the power of the peripheral portion of this aspherical surface is made to be small as much as possible, otherwise to be positive power to negative power of the center portion. By such way, the light at the position where the height of the light is high is widely refracted toward the optical axis side, and thus the light incidence angle to the image plane can be small. Therefore, the following condition is important for the lens at the utmost image plane side.

$$-1.0 < \phi m/\phi p < 0.25 \tag{1}$$

where $\phi m$ is the power of the lens at the position with the maximum height of the light and $\phi p$ is the power of the lens at the paraxis. Here, the power of the lens $\phi m$ in the position with maximum height of the light is defined as follows. That is, it is given by $\phi m = \tan \xi / Hm$, where Hm is the maximum height of the light of the lens and $\xi$ is an inclined angle of the light after passing through the lens when a parallel light is entered from the infinite point at the object side to the maximum height of the light of the lens as an object.

When falling below the minimum of this condition (1), the power of the paraxis becomes weak too much and the whole length has become long, otherwise, the positive power of circumference becomes strong too much. Thus, the performance of circumference is remarkably degraded. On the other hand, when exceeding the upper limit, the positive power of circumference of the lens becomes weak too much and the correction of the incident angle of the light to the image plane becomes insufficient.

It is better to satisfy the following condition (1').

$$-0.5 < \phi m/p < 0.20 \tag{1'}$$

It is much better to satisfy the following condition (1").

$$-0.2 < \phi m/\phi p < 0.18 \tag{1''}$$

The image forming optical system comprise in order from the object side, a first lens having positive refracting power, a second lens having negative refracting power, a concave surface of which is directed toward the object side, a third lens having positive refracting power, a convex surface of which is directed toward an image side and a fourth lens having negative refracting power, wherein the first lens consists of glass and the second lens and the third lens are cemented.

It is desirable that both of refracting surfaces of the first lens having positive refracting power are spherical surface.

When making an optical surface aspherical surface, there are methods of manufacture by grinding and a method of manufacture by molding formation. In the former case, much manpower-day is needed and moreover brings a welter to the refracting surface. Therefore, a good optical performance cannot be obtained. As for the latter, manpower-day is not necessary for the formation. However, since it takes cost and time for processing a die for the molding, it is hard to be referred as being cheap. Moreover, the surface precision as much as the conventional polished spherical surface cannot be obtained and a good optical performance cannot be achieved.

By constituting the first lens with glass lens, it is possible to manufacture it by polishing process which is low cost.

A similar effect can be seen by constituting only with spherical surface. By constituting as mentioned above, a high precision lens can be manufactured. Thus, a good optical performance can be obtained as mentioned above.

Glass lens is more resistant against changes of refracting index and its volume by temperature change and humidity change than plastic lens. Therefore, it is possible to suppress degrading of the performance of whole image forming optical system by concentrating the power to the first lens since the first lens consists of glass. Therefore, it is desirable to satisfy the following condition (2).

$$0.4 < f/f1 < 2.0 \quad (2)$$

where f is the focal length of the whole image forming optical system and f1 is the focal length of the first lens.

When exceeding the upper limit of this condition (2), by causing to increase excessively the power of the first lens, it becomes necessary to increase powers of other lenses and will cause generation of aberration and increase of decentering sensitivity. On the other hand, when falling below the minimum, the power of the first lens becomes too much small and the quantity of degradation of performance becomes big to the temperature and the humidity change.

It is better to satisfy the following condition.

$$0.6 < f/f1 < 1.5 \quad (2')$$

It is much better to satisfy the following condition.

$$0.8 < f/f1 < 1.2 \quad (2'')$$

A cemented lens of the second lens and the third lens which is positioned in the middle of the image forming optical system is the lens which becomes a factors for generating coma, curvature of field and astigmatism. Therefore, to keep small as to the deflection angle, that is, the angle made by the incident light and the exiting light to the cemented lens is important in order to reduce generation of such aberrations as much as possible. By the reason mentioned above, it is possible to make small to the utmost with respect to the performance change when lenses are in a relative decentering position because the generation rate of aberrations when they are not in decentering position is small.

It is good to satisfy the following condition (3) from these reasons.

$$0.5 < r2f/r3r < 4.0 \quad (3)$$

where r2f is a curvature radius on the side of the object of the second lens and r3r is a curvature radius on the side of the image of the third lens.

When exceeding the upper limit or falling below a minimum limit of this condition (3) the deflection angle becomes big too much and it becomes difficult to correct the aberrations generated in the cemented lens, by the first lens and the fourth lens. Therefore, the good optical performance cannot be obtained, and moreover the decentering sensitivity becomes big and the degree of difficulty in manufacture increases.

It is better to satisfy the following condition.

$$1.0 < r2f/r3r < 3.0 \quad (3')$$

It is much better to satisfy the following condition.

$$1.3 < r2f/r3r < 2.5 \quad (3'')$$

In the image forming optical system, in order to shorten the total length, a telephoto type optical system is constituted so that the composite power of the first lens and the cemented lens consisting of the second lens and the third lens has positive power, and the power of the fourth lens is made to be negative. Therefore, in order to achieve well-balanced relation between the total length and a performance in this telephoto type arrangement where the positive power and the negative power are arranged, it is good to satisfy the following conditions (4) and (5).

$$0.3 < f123/|f4| < 2.0 \quad (4)$$

$$0.5 < f/|f4| < 2.0 \quad (5)$$

where f123 is the composite focal length of the first lens and the cemented lens consisting of the second lens and the third lens, f4 is the focal length of the fourth lens and f is the focal length of the whole image forming optical system.

When missing from the above conditions (4), (5), the balance of the positive power and the negative power which constitute the telephoto type system collapses and this causes increase of the whole length and degradation of the performance. That is, when exceeding the upper limit of the conditions above mentioned, it is disadvantageous for shortening the total length because the negative power the telephoto type system becomes weak. On the other hand, when falling below the minimum limit, the negative power in the telephoto type system becomes strong too much. Accordingly the positive power must be increased and aberrations generated in each lens increase. Therefore, it becomes difficult to secure performance.

It is better to satisfy the following conditions.

$$0.4 < f123/|f4| < 1.5 \quad (4')$$

$$0.6 < f/|f4| < 1.7 \quad (5')$$

It is much better to satisfy the following conditions.

$$0.5 < f123/|f4| < 1.0 \quad (4'')$$

$$0.8 < f/|f4| < 1.4 \quad (5'')$$

When using CCD as an imaging element, if off-axial luminous flux exited from an image forming optical system enters into an image plane at too big incident angle, a phenomenon so-called the shading occurs, where the brightness of a picture differs at the center of the picture and at the circumference of the picture. On the other hand, if an incident angle to the image plane is small, this problem is reduced. However, in this case, the total length of image forming optical system becomes longer. Therefore, it is good to satisfy the following condition (6).

$$0.6 < EXP/f < 2.0 \quad (6)$$

Where EXP is the distance from an image plane to an exit pupil and f is the focal length of the image forming optical system as a whole.

When exceeding the upper limit of this condition (6), the total length becomes long. On the other hand, when falling below the minimum limit the incident angle to CCD becomes too big, and the brightness at the circumference of the picture decreases.

So, it is good to satisfy the following condition (6').

$$0.8 < EXP/f < 1.7 \quad (6')$$

It is better to satisfy the following condition (6'').

$$1.0 < EXP/f < 1.4 \quad (6'')$$

It is good to satisfy the following condition (7), where Fno is fully opened f-number of the optical system and P is a pitch of a picture element of the imaging element.

$$0.40[1/\mu m] < Fno/P[\mu m] < 2.20[1/\mu m] \quad (7)$$

When exceeding the upper limit of this condition (7), the quantity of light per pixel decreases because the optical system becomes too dark or the pitch of the picture element becomes too much small. Therefore, the shutter speed becomes slow and this causes a hand blur and increase of noise owing to long exposure time. On the other hand, when falling below the minimum limit, the pitch becomes too big to be unable to get high pixel image data.

It is better to satisfy the following condition (7').

$$0.55[1/\mu m] < Fno/P[\mu m] < 1.50[1/\mu m] \quad (7')$$

It is much better to satisfy the following condition (7").

$$0.77[1/\mu m] < Fno/P[\mu m] < 1.18[1/\mu m] \quad (7")$$

Then, when TL is the full length of an optical system and ML is the minimum thickness of a plastic lens on the axis, it is good to satisfy the following condition (8).

$$0.045 < ML/TL < 0.100 \quad (8)$$

When exceeding the upper limit of this condition (8), the workability of a glass lens is aggravated, as the thickness of center of the glass lens cannot be sufficiently secured because the minimum thickness of a plastic lens on the axis is too big to the total length. On the other hand, when falling below the minimum limit, plastic resin cannot be entered smoothly into a. molding die because the minimum thickness of a plastic lens on the axis is too small. Accordingly it causes generating stress and double refraction, and lowering productivity since much longer time is necessary for molding.

It is better to satisfy the following condition (8').

$$0.055 < ML/TL < 0.085 \quad (8')$$

It is much better to satisfy the following condition (8").

$$0.067 < ML/TL < 0.072 \quad (8")$$

Then, it is good to satisfy the following condition (9), where Rc is a curvature radius of a cemented surface of the cemented lens and Rave is an average value of the curvature radius on the incident side and the curvature radius on the exiting side.

$$-0.30 < Rave/Rc < 0.15 \quad (9)$$

When exceeding the upper limit of this condition (9) the achromatic function does not work since the power of both lenses cemented becomes too weak as the value of the curvature radius of the cemented surface becomes closely to these of the incident surface and the exiting surface. On the other hand, when falling below the minimum limit, to the contrary, the correction of chromatism becomes too excessive because the power of two cemented lenses becomes too strong.

It is better to satisfy the following condition (9').

$$0.20 < Rave/Rc < 0.10 \quad (9')$$

It is much better to satisfy the following condition (9").

$$0.12 < Rave/Rc < 0.06 \quad (9")$$

Hereinafter, embodiments of the image forming optical system according to the present invention will be explained in detail, referring to FIG. 1 to FIG. 4.

FIRST EMBODIMENT

Figure 1:
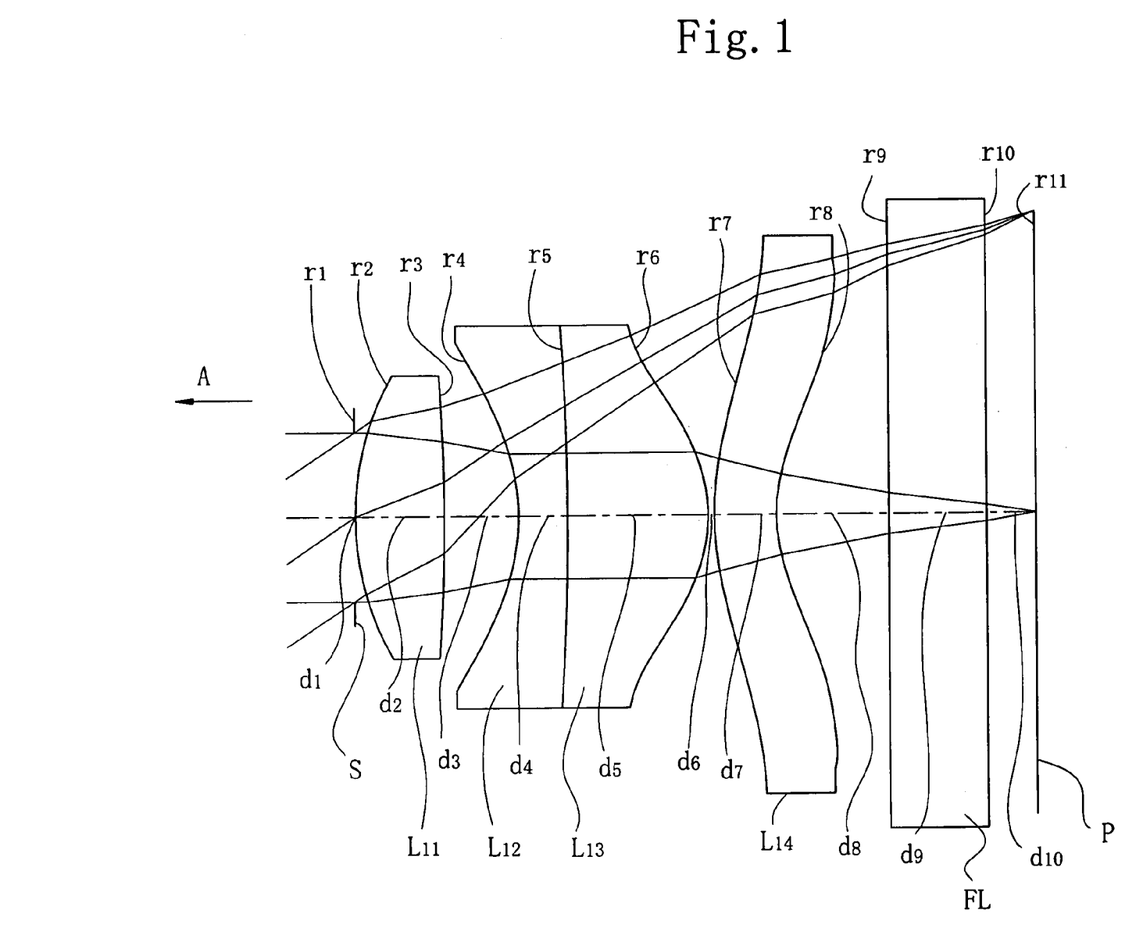
FIG. 1 is a sectional view showing an optical arrangement developed along the optical axis in the first embodiment of an image forming optical system according to the present invention.

FIG. 1 is a sectional view showing an optical arrangement developed along the optical axis in the first embodiment of an image forming optical system.

In FIG. 1, an image forming optical system of the first embodiment comprises, in order from an object side A toward an imaging element surface P, an aperture stops S, a first lens L11 having double-convex surfaces, a second lens L12 having negative refracting power, a concave surface of which is directed toward an object side, a third lens having positive refracting power, a convex surface of which is directed toward an image side, a fourth lens L14 which is a meniscus lens having negative refracting power, a convex surface of which is directed toward the object side and filter members FL. The second lens L12 and the third lens L13 are cemented.

In this embodiment, the first lens L11 consists of glass. The second lens L12, the third lens L13 and the fourth lens L14 are made of plastic. The both surfaces of the first lens L11 are spherical. The object surface side of the second lens L12, the image surface side of the third lens L13 and the both surfaces of the fourth lens L14 are aspherical. An optical system which is strong against environment change is achieved by using polished glass as both spherical surfaces of the first lens L11 having strong power.

As plastic material to be used here, polycarbonate material is used for the second lens L12 and the fourth lens L14, and Zeonex which is polyolefin material is used for Lens L13 having positive refracting power. In the image forming optical system of this embodiment, focal length is 4.65 mm, F number is 2.8, image height HT is 3.0 mm and half field angle ω is 33° whereby a wide angle image forming optical system is constituted.

On the image plane of the optical system, an imaging element having 1,300,000 pixels (a pitch of picture element 3.6 μm.) in ⅓ inches square is arranged.

Lens data of optical members constituting the image forming optical system of the first embodiment are listed below.

In the numerical data, $r_1$, $r_2$, - - - denote radii of curvature of individual lens surfaces; $d_1$, $d_2$, - - - denote thickness of individual lenses or air space between them; $n_{d1}$, $n_{d2}$, - - - denote refractive indices of individual lenses at the d line; $v_{d1}$, $v_{d2}$, - - - denotes Abbe's numbers of individual lenses; Fno denotes an F number; f denotes total focal length of the image forming optical system, and D0 denotes distance from an object to the first surface of a lens element.

Also, when z is taken as the coordinate in the direction of the optical axis, y is taken as the coordinate normal to the optical axis, K represents a conic constant, and $A_4$, $A_6$, $A_8$, and $A_{10}$ represent aspherical coefficients, the configuration of each of the aspherical surface is expressed by the following equation:

$$z = (y^2/r) / \left[1 + \{1 - (1+K)(y/r)^2\}^{1/2}\right] + A_4 y^4 + A_6 y^6 + A_8 y^8 + A_{10} Y^{10}$$

These symbols hold for the numerical data of embodiments to be described later.

numerical data 1 focal length f = 4.65 mm, Fno. = 2.8, image height HT = 3.0 mm, half field angle ω = 33°, distance from an object DO = ∞

$r_1 = \infty$ (aperture stop)
$d_1 = 0.00$
$r_2 = 2.68$
$d_2 = 0.90$      $n_{d2} = 1.5163$      $v_{d2} = 64.1$
$r_3 = -21.36$
$d_3 = 0.77$
$r_4 = -1.96$      (aspherical surface; the fourth surface)
$d_4 = 0.50$      $n_{d4} = 1.5839$      $v_{d4} = 30.2$
$r_5 = -30.60$
$d_5 = 1.47$      $n_{d5} = 1.5091$      $v_{d5} = 56.2$
$r_6 = -1.18$      (aspherical surface; the sixth surface)
$d_6 = 0.05$
$r_7 = 2.21$      (aspherical surface; the seventh surface)
$d_7 = 0.65$      $n_{d7} = 1.5839$      $v_{d7} = 30.2$
$r_8 = 1.03$      (aspherical surface; the eighth surface)
$d_8 = 1.16$
$r_9 = \infty$ -continued numerical data 1

$d_9 = 1.00$  $n_{d9} = 1.5163$  $\nu_{d9} = 64.1$
$r_{10} = \infty$
$d_{10} = 0.50$
$r_{11} = \infty$ (image plane)

aspherical surface coefficient the fourth surface $K = -6.2276$
$A_2 = 0$  $A_4 = -7.2439 \times 10^{-2}$  $A_6 = 3.0016 \times 10^{-2}$
$A_8 = -3.716 \times 10^{-3}$  $A_{10} = -1.4490 \times 10^{-4}$ the sixth surface $K = -3.8561$
$A_2 = 0$  $A_4 = -5.6955 \times 10^{-2}$  $A_6 = 2.3202 \times 10^{-2}$
$A_8 = -3.6193 \times 10^{-3}$  $A_{10} = 3.8559 \times 10^{-4}$ the seventh surface $K = -8.5014$
$A_2 = 0$  $A_4 = -3.7239 \times 10^{-3}$ the eighth surface $K = -5.0721$
$A_2 = 0$  $A_4 = -1.3207 \times 10^{-2}$  $A_6 = 4.3425 \times 10^{-4}$

SECOND EMBODIMENT

Figure 2:
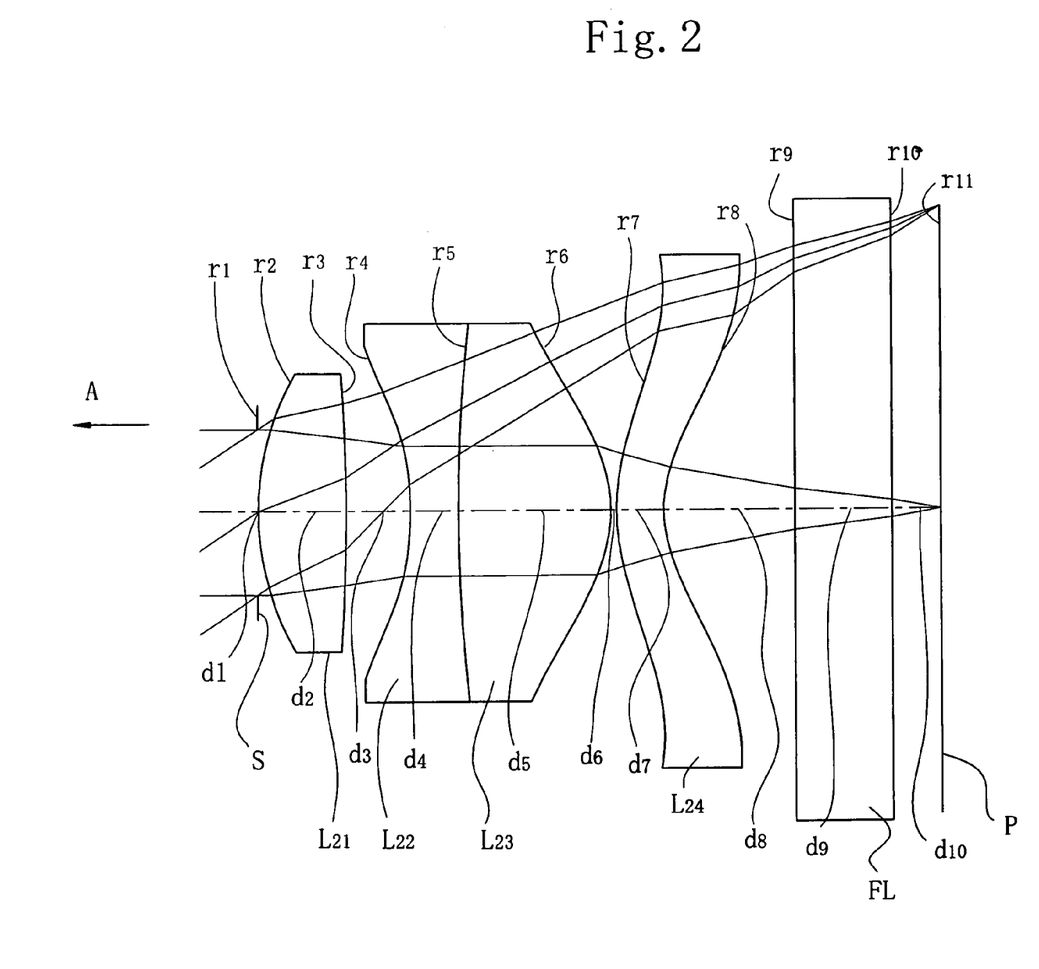
FIG. 2 is a sectional view showing an optical arrangement, developed along the optical axis in the second embodiment of an image forming optical system according to the present invention.

FIG. 2 is a sectional view showing an optical arrangement developed along the optical axis in the second embodiment of an image forming optical system.

In FIG. 2, an image forming optical system of the second embodiment comprises in order from an object side A toward an imaging element plane P, an aperture stops S, a first lens L21 having double-convex surfaces, a second lens L22 having negative refracting power, a concave surface of which is directed toward an object side, a third lens L23 having positive refracting power, a convex surface of which is directed toward an image side and, a fourth lens L24 which is a meniscus lens having negative refracting power, a convex surface of which is directed toward the object side and filter members FL. The second lens L22 and the third lens 23 are cemented.

In this embodiment, the first lens L21 consists of glass. The second lens L22, the third lens L13 and the fourth lens L24 are made of plastic. The both surfaces of the first lens L21 are a spherical. The object side surface of the second lens L22, the image side surface of the third lens L23 and the both surfaces of the fourth lens L24 are aspherical. An optical system which is strong against environment change can be achieved by using polished glass as both surfaces of the first lens L21 having strong power. As plastic materials to be used here, polycarbonate material is used for the second lens L22 and the fourth lens L24, and Zeonex which is polyolefin material is used for Lens L23. In the image forming optical system of this embodiment, focal length is 4.62 mm, F number is 2.8, image height HT is 3.0 mm and half field angle ω is 33° whereby a wide angle image forming optical system is constituted. On the image plane of the optical system, an imaging element having 2,000,000 pixels (a pitch of picture element 3.0 μm) in ⅓ inches square is arranged.

numerical data 2 focal length f = 4.62 mm, Fno. = 2.8, image height HT = 3.0 mm,
half field angle ω = 33°, distance from an object DO = ∞

$r_1 = \infty$ (aperture stop)
$d_1 = 0.00$
$r_2 = 2.85$
$d_2 = 0.89$  $n_{d2} = 1.5163$  $\nu_{d2} = 64.1$
$r_3 = -20.08$
$d_3 = 0.67$
$r_4 = -2.42$  (aspherical surface; the fourth surface)
$d_4 = 0.50$  $n_{d4} = 1.5839$  $\nu_{d4} = 30.2$
$r_5 = 23.95$
$d_5 = 1.57$  $n_{d5} = 1.5091$  $\nu_{d5} = 56.2$
$r_6 = -1.24$  (aspherical surface; the sixth surface)
$d_6 = 0.05$
$r_7 = 1.66$  (aspherical surface; the seventh surface)
$d_7 = 0.49$  $n_{d7} = 1.5839$  $\nu_{d7} = 30.2$
$r_8 = 0.89$  (aspherical surface; the eighth surface)
$d_8 = 1.33$
$r_9 = \infty$
$d_9 = 1.00$  $n_{d9} = 1.5163$  $\nu_{d9} = 64.1$
$r_{10} = \infty$
$d_{10} = 0.50$
$r_{11} = \infty$ (image plane)

aspherical surface coefficient the fourth surface $K = -8.6660$
$A_2 = 0$  $A_4 = -5.9446 \times 10^{-2}$  $A_6 = 2.3227 \times 10^{-2}$
$A_8 = -4.5130 \times 10^{-3}$  $A_{10} = 7.0562 \times 10^{-4}$ the sixth surface $K = -4.2776$
$A_2 = 0$  $A_4 = -5.2010 \times 10^{-2}$  $A_6 = 1.8759 \times 10^{-2}$
$A_8 = -3.3248 \times 10^{-3}$  $A_{10} = 4.0585 \times 10^{-4}$ the seventh surface $K = -5.6700$
$A_2 = 0$  $A_4 = -9.5173 \times 10^{-3}$ the eighth surface $K = -3.7822$
$A_2 = 0$  $A_4 = -1.2552 \times 10^{-2}$  $A_6 = 2.3741 \times 10^{-4}$

THIRD EMBODIMENT

Figure 3:
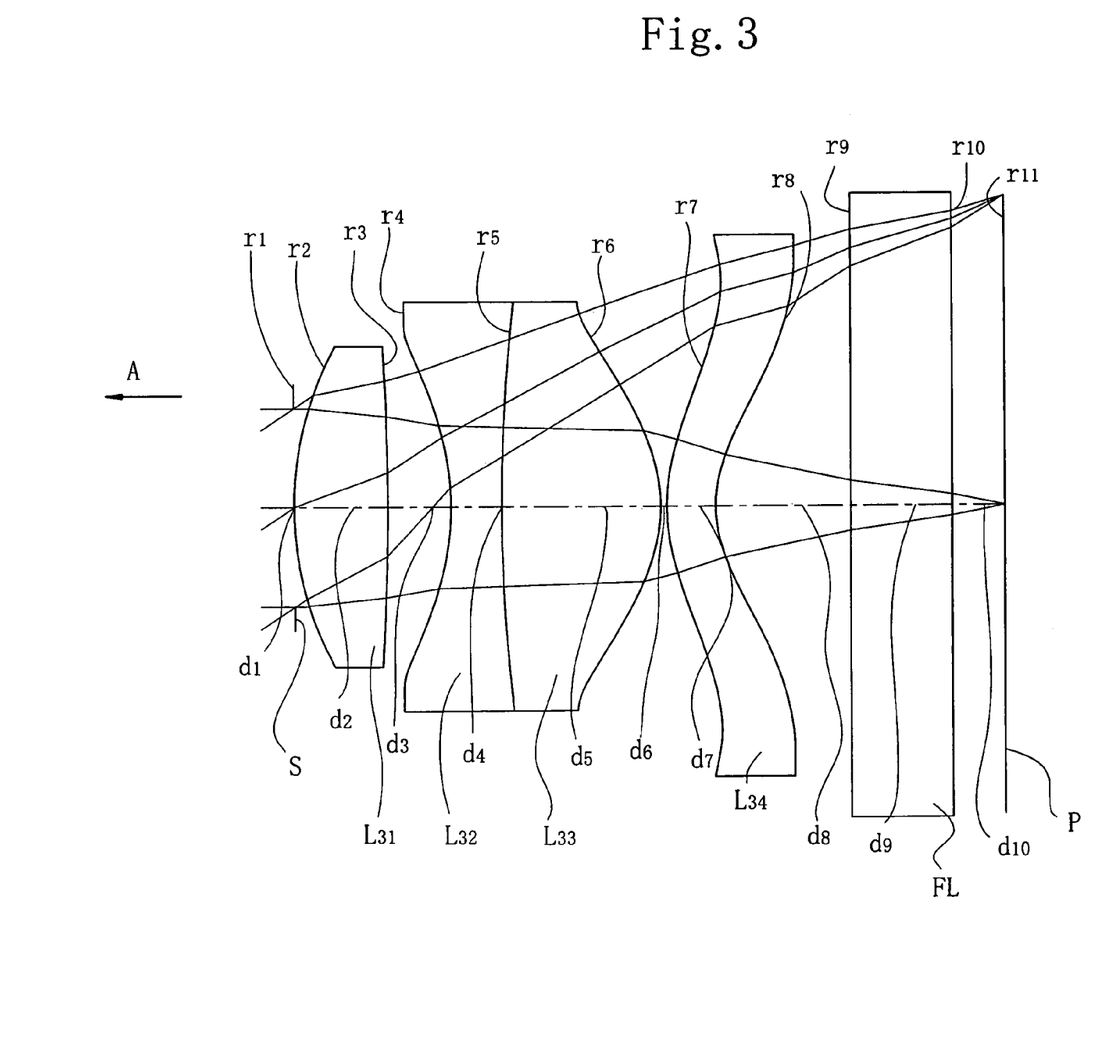
FIG. 3 is a sectional view showing an optical arrangement, developed along the optical axis in the third embodiment of an image forming optical system according to the present invention.

FIG. 3 is a sectional view showing an optical arrangement, developed along the optical axis in the third embodiment of an image forming optical system.

In FIG. 3, an image forming optical system of the third embodiment comprises in order from an object side A toward an imaging element plane P, an aperture stops S, a first lens L31 having double-convex surfaces, a second lens L32 having negative refracting power a concave surface of which is directed toward an object side, a third lens L33 having positive refracting power, a convex surface of which is directed toward an image side and, a fourth lens L34 which is a meniscus lens having negative refracting power, a convex surface of which is directed toward the object side, and filter members FL. The second lens L32 and the third lens 33 are cemented. In this embodiment, the first lens L31 consists of glass. The second lens L32, the third lens L33 and the fourth lens L34 are made of plastic. The both surfaces of the first lens L31 are aspherical. The object side surface of the second lens L32, the image side surface of the third lens L33 and the both surfaces of the fourth lens L24 are aspherical. An optical system which is strong against environment change can be achieved by using polished glass as both surfaces of the first lens L31 having strong power. As plastic materials to be used here, polycarbonate material is used for the second lens L32 and the fourth lens L34, and Zeonex which is polyolefin material is used for Lens L33. In the image forming optical system of this embodiment, focal length is 4.57 mm, F number is 2.4, image height HT is 3.0 mm and half field angle ω is 33° whereby a wide angle image forming optical system is constituted.

On the image plane of the optical system, an imaging element having 3,000,000 pixels (a pitch of picture element 2.4 μm) in ⅓ inches square is arranged.

--- numerical data 3 focal length f = 4.57 mm, Fno. = 2.8, HT = 3.0 mm, half field angle
ω = 33°, distance from an object DO = ∞

$r_1$ = ∞ (aperture stop)
$d_1$ = 0.00
$r_2$ = 3.16
$d_2$ = 0.9     second$_2$ = 1.5831     $v_{d2}$ = 59.4
$r_3$ = −30.42
$d_3$ = 0.62
$r_4$ = −2.55     (aspherical surface; the fourth surface)
$d_4$ = 0.50     $n_{d4}$ = 1.5839     $v_{d4}$ = 30.2
$r_5$ = 17.65
$d_5$ = 1.60     $n_{d5}$ = 1.5091     $v_{d5}$ = 56.2
$r_6$ = −1.32     (aspherical surface; the sixth surface)
$d_6$ = 0.05
$r_7$ = 1.54     (aspherical surface; the seventh surface)
$d_7$ = 0.48     $n_{d7}$ = 1.5839     $v_{d7}$ = 30.2
$r_8$ = 0.88     (aspherical surface; the eighth surface)
$d_8$ = 1.34
$r_9$ = ∞
$d_9$ = 1.00     $n_{d9}$ = 1.5163     $v_{d9}$ = 64.1
$r_{10}$ = ∞
$d_{10}$ = 0.50
$r_{11}$ = ∞ (image plane)

aspherical surface coefficient the fourth surface

K = −1.1792
$A_2$ = 0     $A_4$ = −6.7015 × $10^{-2}$     $A_6$ = 2.9979 × $10^{-2}$
$A_8$ = −6.3844 × $10^{-3}$     $A_{10}$ = 8.1531 × $10^{-4}$ the sixth surface K = −4.4150
$A_2$ = 0     $A_4$ = −4.5570 × $10^{-2}$     $A_6$ = 1.4393 × $10^{-2}$
$A_8$ = −2.2759 × $10^{-3}$     $A_{10}$ = 3.0507 × $10^{-4}$ the seventh surface

K = −4.3210
$A_2$ = 0     $A_4$ = −1.2167 × $10^{-2}$ the eighth surface

K = −3.4003
$A_2$ = 0     $A_4$ = −1.3540 × $10^{-2}$     $A_6$ = 6.7047 × $10^{-5}$

---

FOURTH EMBODIMENT

Figure 4:
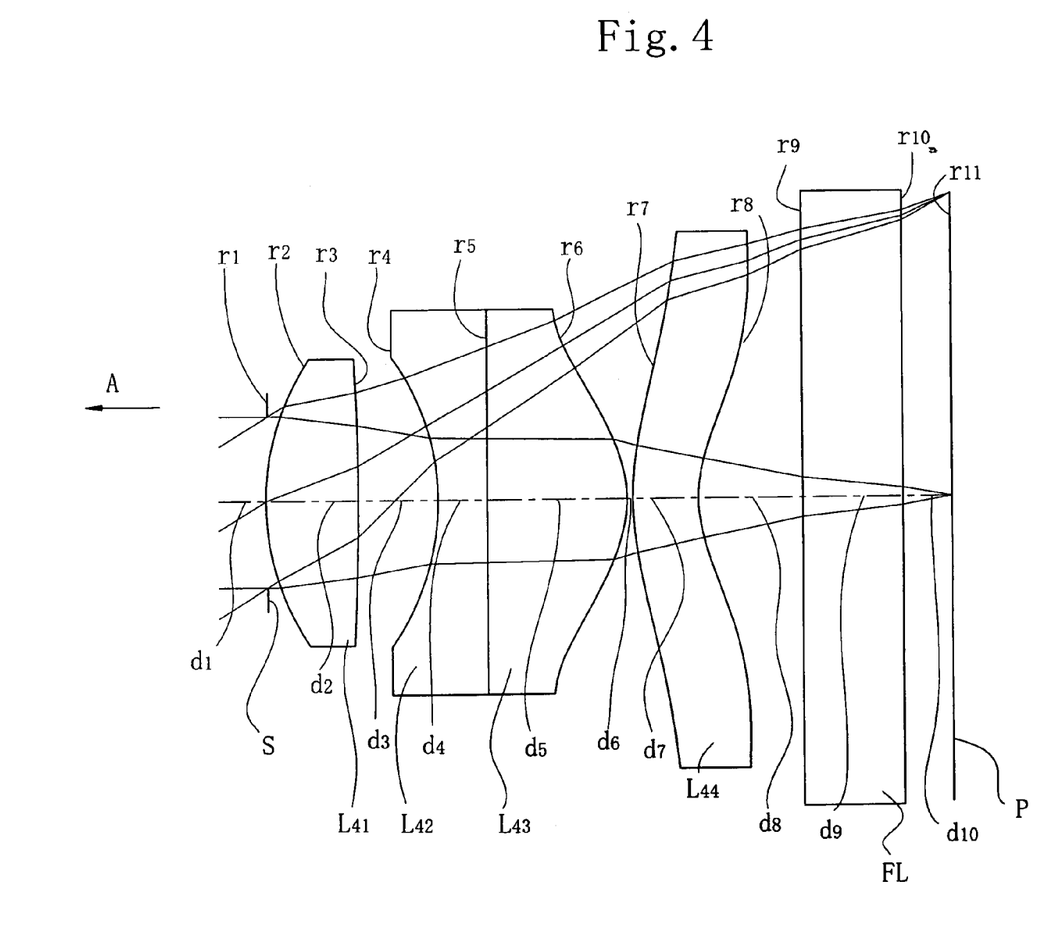
FIG. 4 is a sectional view showing an optical arrangement, developed along the optical axis in the fourth embodiment of an image forming optical system according to the present invention.
Figure 5A:
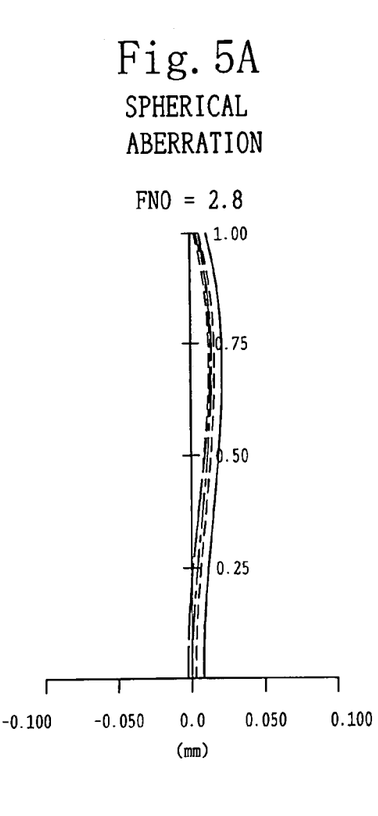
FIGS. 5A, 5B and 5C are graphs showing spherical aberration, astigmatism and distortion in the first embodiment of an image forming optical system according to the present invention.
Figure 5B:
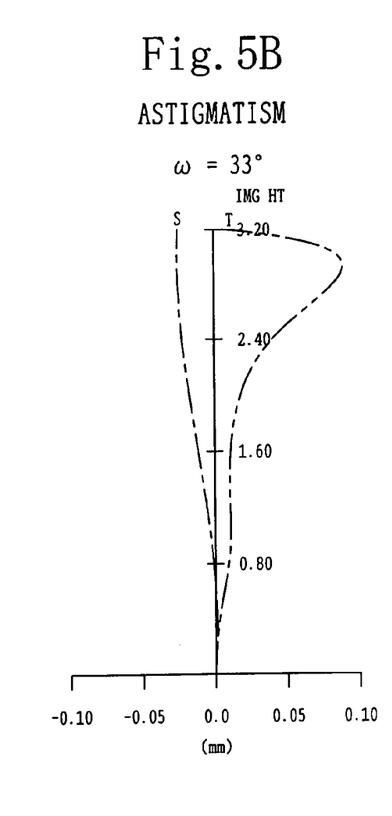
Figure 5C:
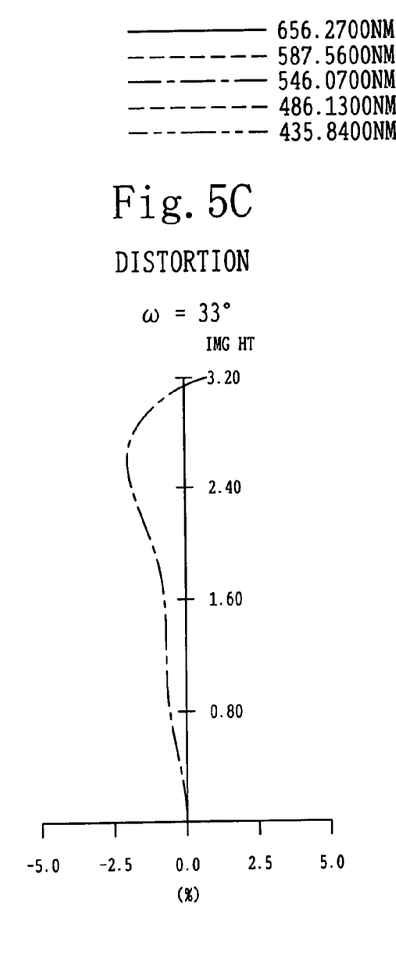
Figure 6A:
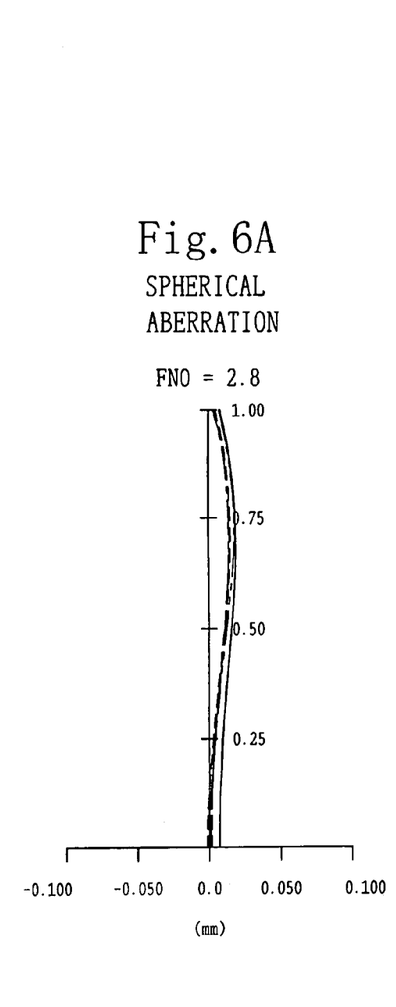
FIGS. 6A, 6B and 6C are graphs showing a spherical aberration, an astigmatism and a distortion in the second embodiment of an image forming optical system according to the present invention.
Figure 6B:
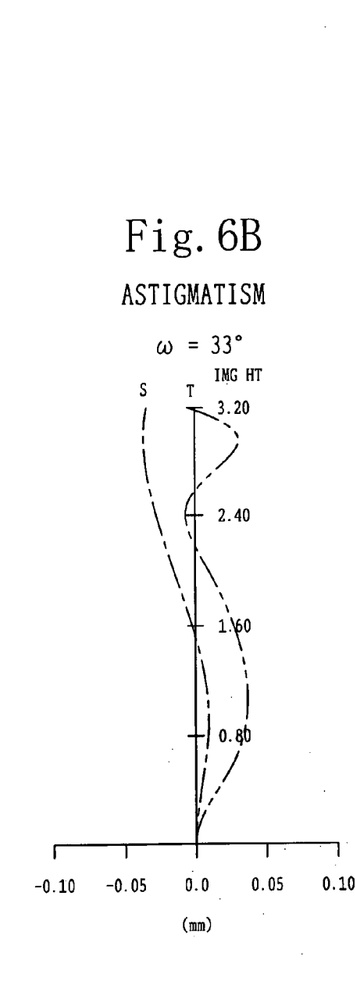
Figure 6C:
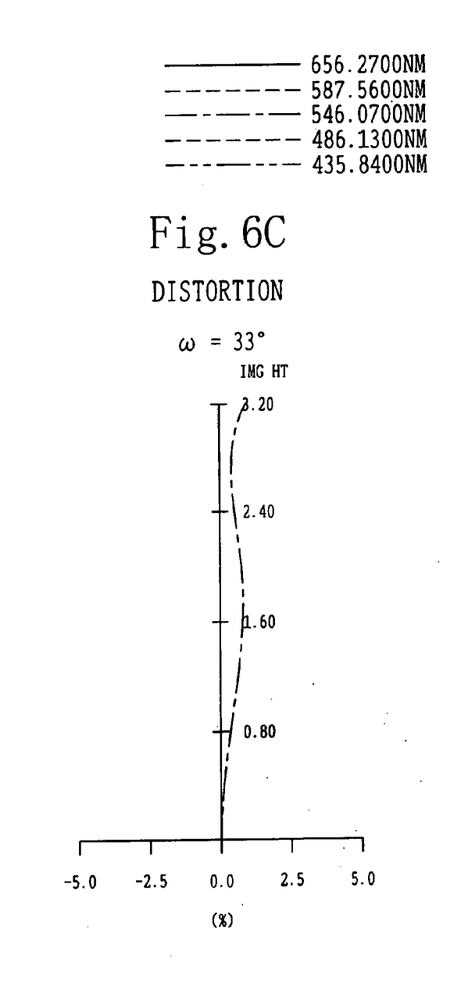
Figure 7A:
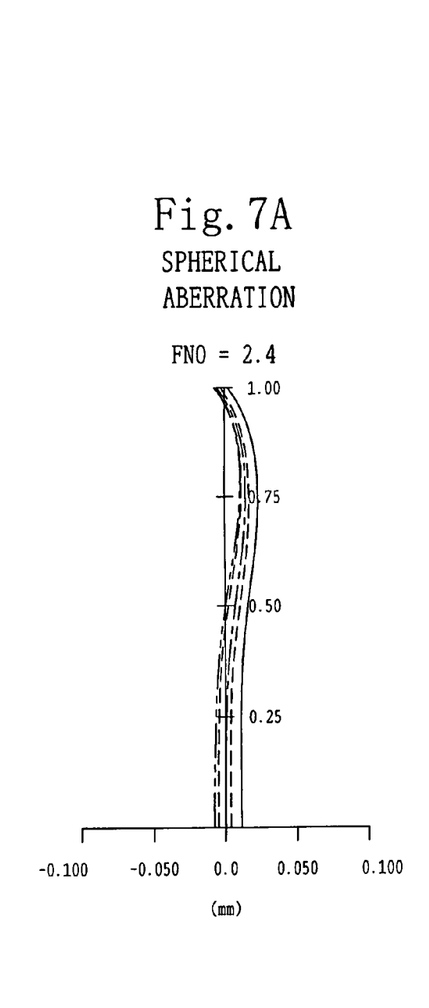
FIGS. 7A, 7B and 7C are graphs showing a spherical aberration, an astigmatism and a distortion in the third embodiment of an image forming optical system according to the present invention.
Figure 7B:
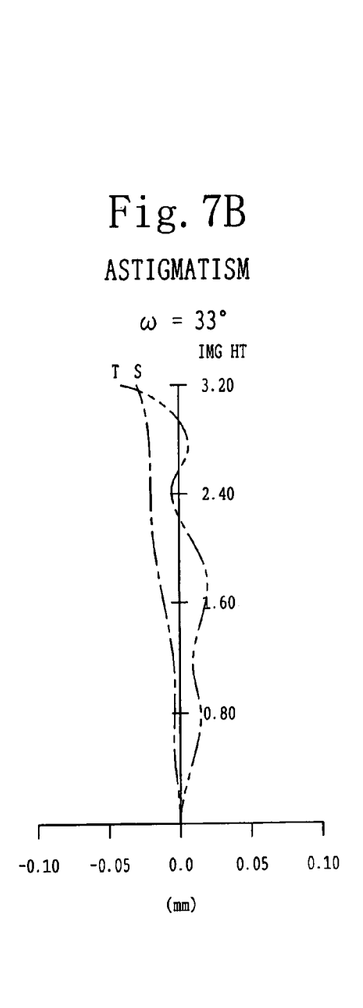
Figure 7C:
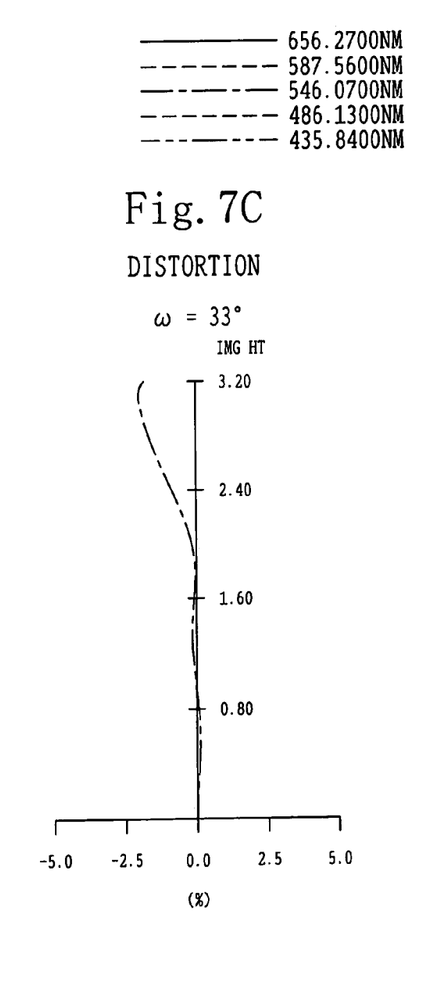
Figure 8A:
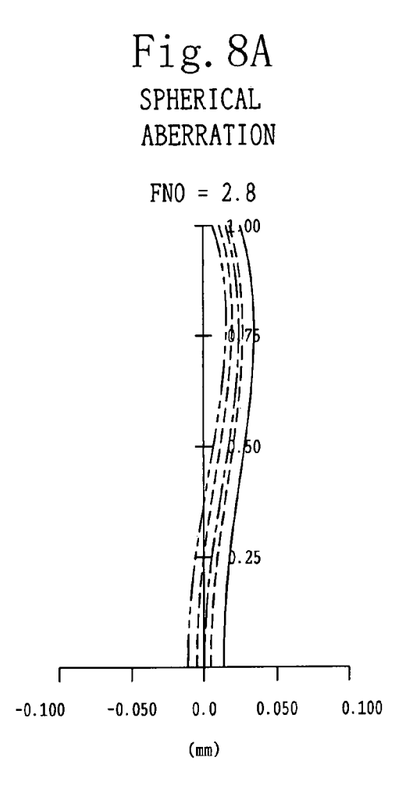
FIGS. 8A, 8B and 8C are graphs showing a spherical aberration, an astigmatism and a distortion in the fourth embodiment of an image forming optical system according to the present invention.
Figure 8B:
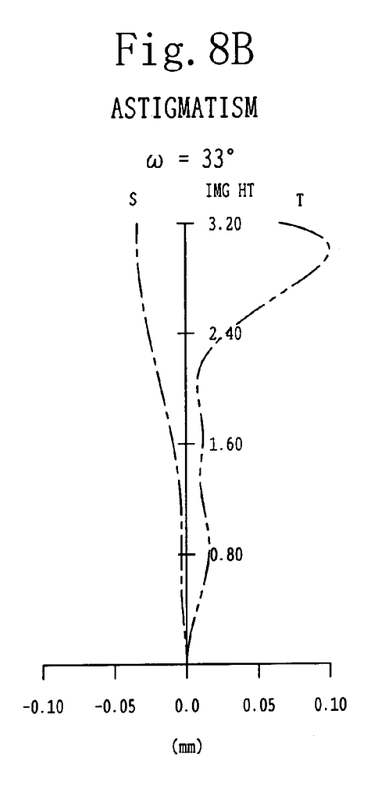
Figure 8C:
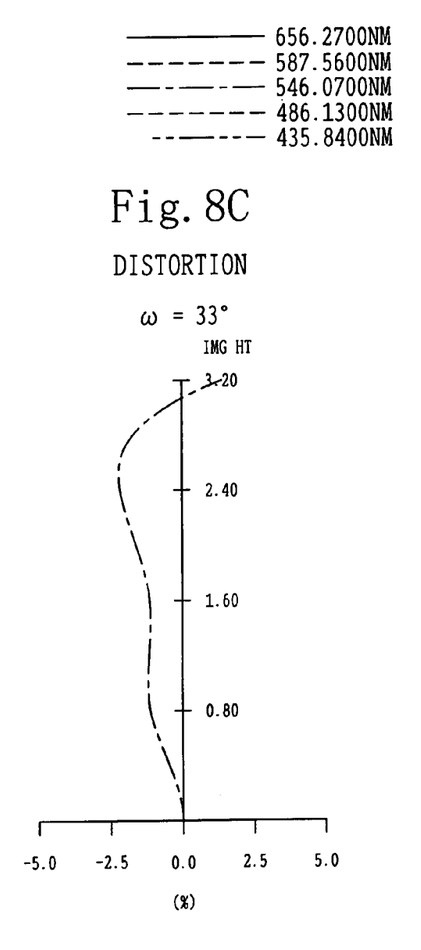

FIG. 4 is a sectional view showing an optical arrangement, developed along the optical axis in the fourth embodiment of an image forming optical system.

In FIG. 4, an image forming optical system of the fourth embodiment comprises in order from an object side A toward an imaging element plane P, an aperture stops S, a first lens L41 having double-convex surfaces, a second lens L42 having negative refracting power a concave surface of which is directed toward an object side and, a third lens L43 having positive refracting power, a convex surface of which is directed toward an image side and, a fourth lens L44 which is a meniscus lens having negative refracting power, a convex surface of which is directed toward the object side and filter members FL. The second lens L42 and the third lens 43 are cemented. In this embodiment, all lenses are made of plastic.

The both surfaces of the first lens L41 are spherical. The object side surface of the second lens L42, the image side surface of the third lens L43 and the both surfaces of the fourth lens L44 are aspherical. An optical system which is strong against environment change can be achieved if polished glass with double spherical surfaces is used for the first lens L41 having strong power. As plastic materials to be used here, polycarbonate material is used for the second lens L42 and the fourth lens L44, and Zeonex which is polyolefin material is used for Lens L33. In the image forming optical system of this embodiment, focal length is 4.79 mm, F number is 2.8, image height HT is 3.0 mm and half field angle ω is 32° whereby a wide angle optical imaging system is constituted.

On the image, plane of the optical system ,an imaging element having 1,300,000 pixels (a pitch of picture element 3.6 μm) i n ⅓ inches square is arranged

--- numerical data 4 focal length f = 4.79 mm, Fno. = 2.8, image height HT = 3.0 mm,
half field angleω = 32°, distance from an object DO = ∞

$r_1$ = ∞ (aperture stop)
$d_1$ = 0.00
$r_2$ = 2.55
$d_2$ = 0.93     $n_{d2}$ = 1.5091     $v_{d2}$ = 56.2
$r_3$ = −21.90
$d_3$ = 0.81
$r_4$ = −1.95     (aspherical surface; the fourth surface)
$d_4$ = 0.50     $n_{d4}$ = 1.5839     $v_{d4}$ = 30.2
$r_5$ = 508.05
$d_5$ = 1.46     $n_{d5}$ = 1.5091     $v_{d5}$ = 56.2
$r_6$ = −1.17     (aspherical surface; the sixth surface)
$d_6$ = 0.05
$r_7$ = 2.31     (aspherical surface; the seventh surface)
$d_7$ = 0.67     $n_{d7}$ = 1.5839     $v_{d7}$ = 30.2
$r_8$ = 1.01     (aspherical surface; the eighth surface)
$d_8$ = 1.08
$r_9$ = ∞
$d_9$ = 1.00     $n_{d9}$ = 1.5163     $v_{d9}$ = 64.1
$r_{10}$ = ∞
$d_{10}$ = 0.50
$r_{11}$ = ∞ (image plane)

aspherical surface coefficient the fourth surface

K = −9.3675
$A_2$ = 0     $A_4$ = −1.1587 × $10^{-1}$     $A_6$ = 7.6878 × $10^{-2}$
$A_8$ = −2.9460 × $10^{-2}$     $A_{10}$ = 5.0577 × $10^{-3}$ the sixth surface K = −3.9196
$A_2$ = 0     $A_4$ = −5.8984 × $10^{-2}$     $A_6$ = 2.6782 × $10^{-2}$
$A_8$ = −4.0895 × $10^{-3}$     $A_{10}$ = 3.6299 × $10^{-4}$ the seventh surface

K = −1.3717
$A_2$ = 0     $A_4$ = −2.5298 × $10^{-3}$ the eighth surface

K = −5.8628
$A_2$ = 0     $A_4$ = −1.4946 × $10^{-2}$     $A_6$ = 6.1189 × $10^{-4}$

---

In the embodiments mentioned above, a part of or all of lenses are made of plastic. However, it is possible to be constituted with glass instead of plastic. If lenses of an image forming optical system are constituted with glass, it is possible to make an image forming optical system which is strong against the change of the temperature and the humidity. If using glass with refractive index which is higher than that of the material used in this embodiment, it is possible to make an image forming optical system having higher performance. If using special low dispersion glass, it is effective for correction of the chromatism. When constituting a lens by plastic, degradation of the performance by environment change can be reduced by using low hygroscopic material.

In order to cut an unnecessary light of ghost, flare and the like, a flare cut stop may be used instead of an aperture stop S. This flare cut aperture may be arranged in any place which is either in front of the first lens, between the second lens and the third lens, between the third lens and the fourth lens, or between the fourth lens and the surface of an imaging element. To make use of the function of flare cut stop, the way of cutting a flare light by using a frame may be adopted. The way for cutting flare light by providing another part may be also used as another way. Also, it is possible to constitute a flare cut aperture by printing, painting and gluing a seal and the like, directly to the image forming optical system.

As to the shape of the stop, any type of shape formed by such as a circle, an ellipse, a rectangle, a polygon and a scope surrounded by a function curve can be also used. For this purpose, these may be not only for cutting detrimental light but also cutting light of the coma flare around the picture plane. Moreover, in order to reduce ghost and flare, coating for preventing reflection can be made to each lens. By using multiple coating the ghost and the flare can be efficiently reduced. Infrared cut coat can be also made to surfaces of a lens and a cover glass and the like.

Furthermore, in order to adjust focus regulation a focusing can be carried out. As focusing method, there are a type where the whole lenses or a part of lenses is moved outward, and other type where the whole lenses or a part of lenses is moved inward.

By shifting a micro lens of CCD, decrease of the brightness around circumference of picture plane can be reduced. For example, the design of the micro lens of CCD may be changed according to the incidence angle of the light in each image height. Correction of decreased quantity of the brightness around circumference of a picture plane can be carried out by image processing.

Numerical values calculated by conditions mentioned above concerning each embodiment from the first embodiment to the fourth embodiment are shown in the following table.

|  | first embodiment | second embodiment | third embodiment | fourth embodiment |
|---|---|---|---|---|
| $\phi m/\phi p$ | −0.11 | 0.13 | 0.14 | −0.14 |
| f/f1 | 1.00 | 0.95 | 0.92 | 1.06 |
| r2f/r3r | 1.66 | 1.95 | 1.94 | 1.66 |
| f123/|f4| | 0.77 | 0.73 | 0.68 | 0.85 |
| f/|f4| | 1.12 | 1.08 | 0.96 | 1.26 |
| EXP/f | 1.26 | 1.29 | 1.29 | 1.17 |
| Fno/P[μm] | 0.78 | 0.93 | 1.17 | 0.78 |
| ML/TL | 0.071 | 0.070 | 0.068 | 0.071 |
| Rave/Rc | 0.051 | −0.076 | −0.110 | −0.003 |

The image forming optical system according to the present invention is suitable for an optical apparatus which is used for electronic instrument such as cameras, cellular phones, portable type information entry terminal and the like using a film and CCD as a recording part.

Figure 9A:
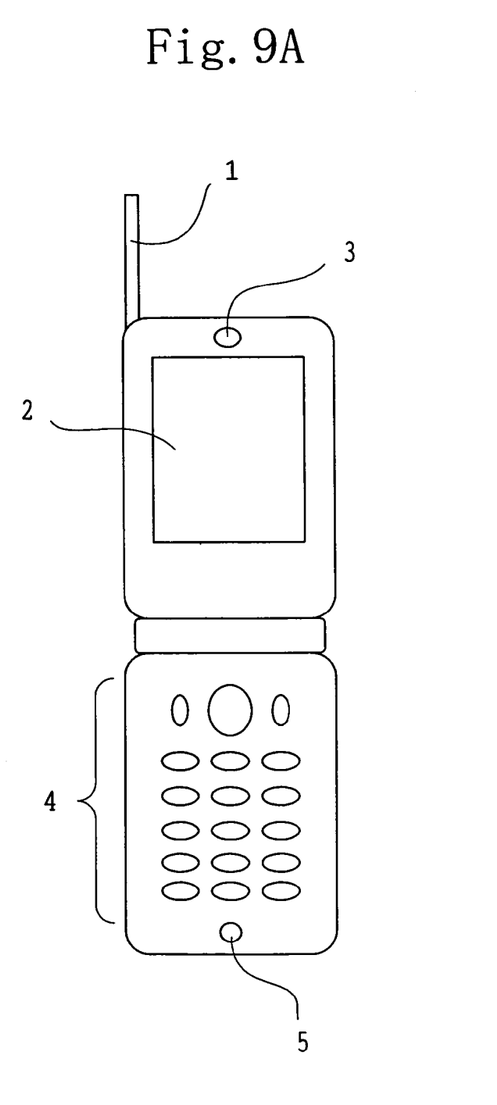
FIGS. 9A and 9B are a front view and a rear view showing an outlined construction of a cellular phone embodied by an image forming optical system according to the present invention.
Figure 9B:
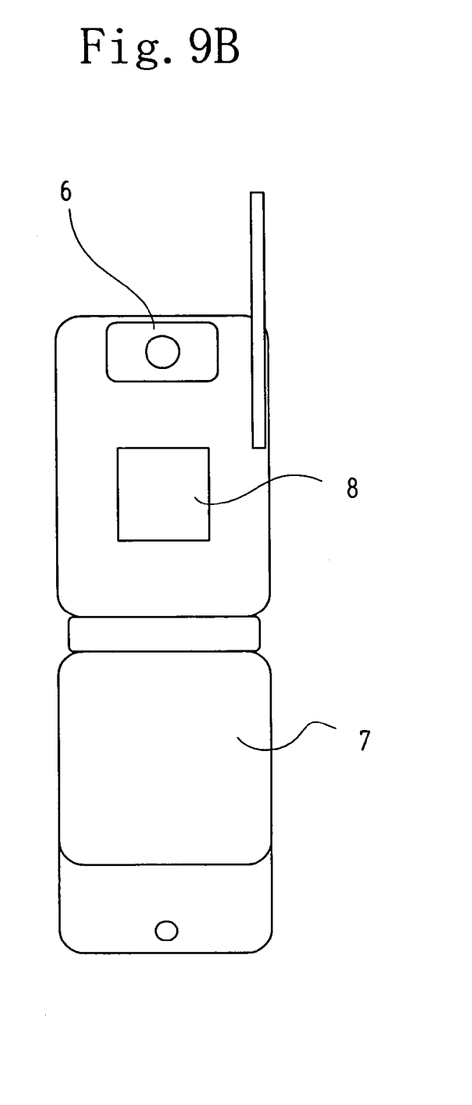

FIG. 9 shows outlined construction of an electronic instrument of the first embodiment according the present invention. This embodiment shows an example where an image forming optical system of the present invention is applied to a cellular phone. FIG. 9A is a front view and FIG. 9B is a rear view showing appearance of the cellular phone.

In FIG. 9, reference numeral 1 represents an antenna for transmitting and receiving an electric wave, 2 represents a display portion such as LCD, 3 is a speaker portion for catching sound, 4 is an operation portion, 5 is a microphone portion, 6 is an image forming optical system portion including an image forming optical system of the present invention, which is arranged at the opposite side to the said portions and 7 is a battery and 8 is a back side monitor.

Figure 10A:
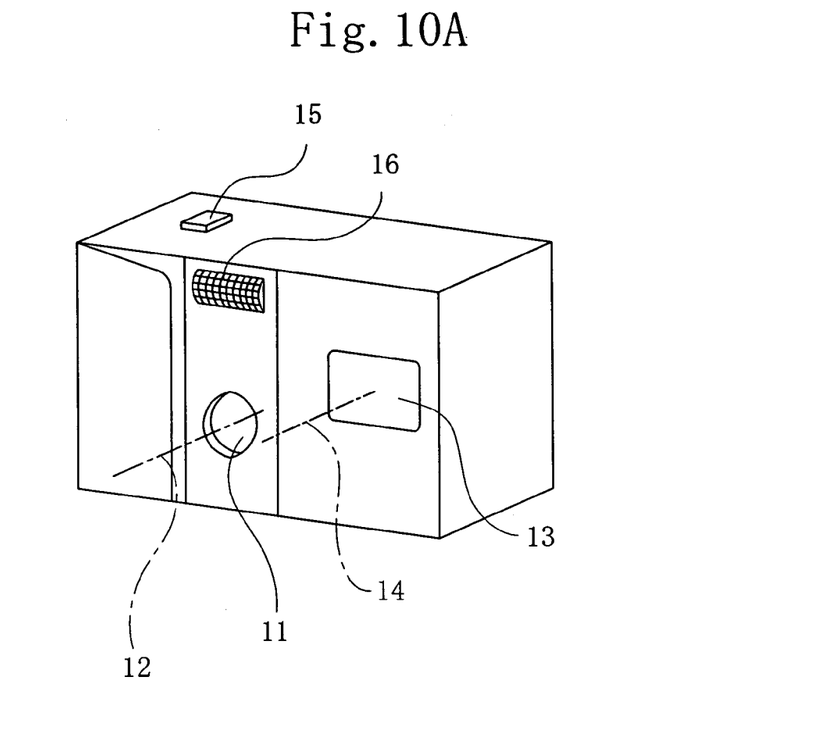
FIGS. 10A and 10B are a front perspective view and a rear perspective view showing an outlined construction of a digital camera embodied by an image forming optical system according to the present invention.
Figure 10B:
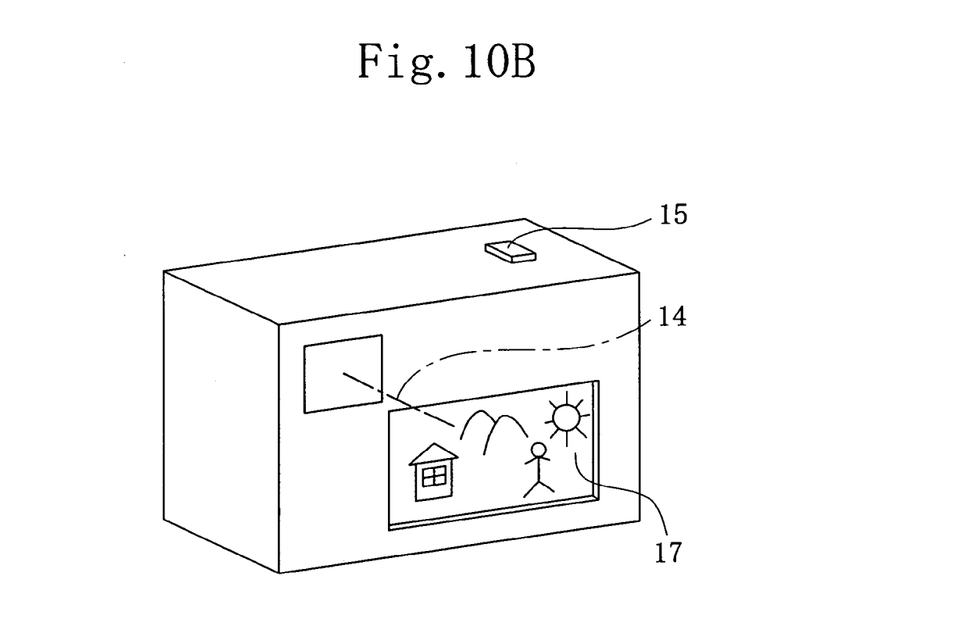

FIG. 10 shows outlined construction of a digital camera in which an image forming optical system according to the present invention is used in a photographing optical system. FIG. 10A is a front perspective view showing appearance of the digital camera and FIG. 9B is a rear perspective view of the same.

FIG. 10, reference numeral 11 represents a photographing optical system having photographing optical path 12, reference numeral 13 is a finder optical system with an optical path 14 for finder, 15 is a shutter button, 16 is a flush lump and 17 is a monitor with liquid crystal display. When pushing the shutter button 15 arranged on the camera, in responding such action photographing is carried out via the photographing optical system 11.

What is claimed is:

1. An imaging optical system consisting of, in order from an object side:
   a first lens having positive refracting power,
   a second lens having negative refracting power, and a concave surface of which is directed toward the object side,
   a third lens having positive refracting power, and a convex surface of which is directed toward an image side, and
   a fourth lens having negative refracting power,
   wherein the second lens and the third lens are cemented together, and wherein at least one of surfaces of the fourth lens is an aspherical surface.

2. An electronic instrument comprising the imaging optical system according to claim 1.

3. An imaging optical system consisting of, in order from an object side:
   a first lens having positive refracting power,
   a second lens having negative refracting power, and a concave surface of which is directed toward the object side,
   a third lens having positive refracting power, a convex surface of which is directed toward an image side, and
   a fourth lens having negative refracting power,
   wherein the first lens is made of glass,
   wherein the second lens and the third lens are cemented together, and
   wherein at least one of surfaces of the fourth lens is an aspherical surface.

4. An imaging optical system according to claim 3, wherein both refracting surfaces of the first lens are spherical.

* * * * *

UNITED STATES PATENT AND TRADEMARK OFFICE
CERTIFICATE OF CORRECTION

PATENT NO.        : 7,248,421 B2
APPLICATION NO.   : 11/364409
DATED             : July 24, 2007
INVENTOR(S)       : Takahiro Amanai It is certified that error appears in the above-identified patent and that said Letters Patent is hereby corrected as shown below:

On title page, item 57 Abstract
  replace line 2, after "refracting power," please add the following
  with --a second lens having negative refracting power--.

Signed and Sealed this

Thirteenth Day of November, 2007

JON W. DUDAS
*Director of the United States Patent and Trademark Office*